United States Patent Office 3,268,632
Patented August 23, 1966

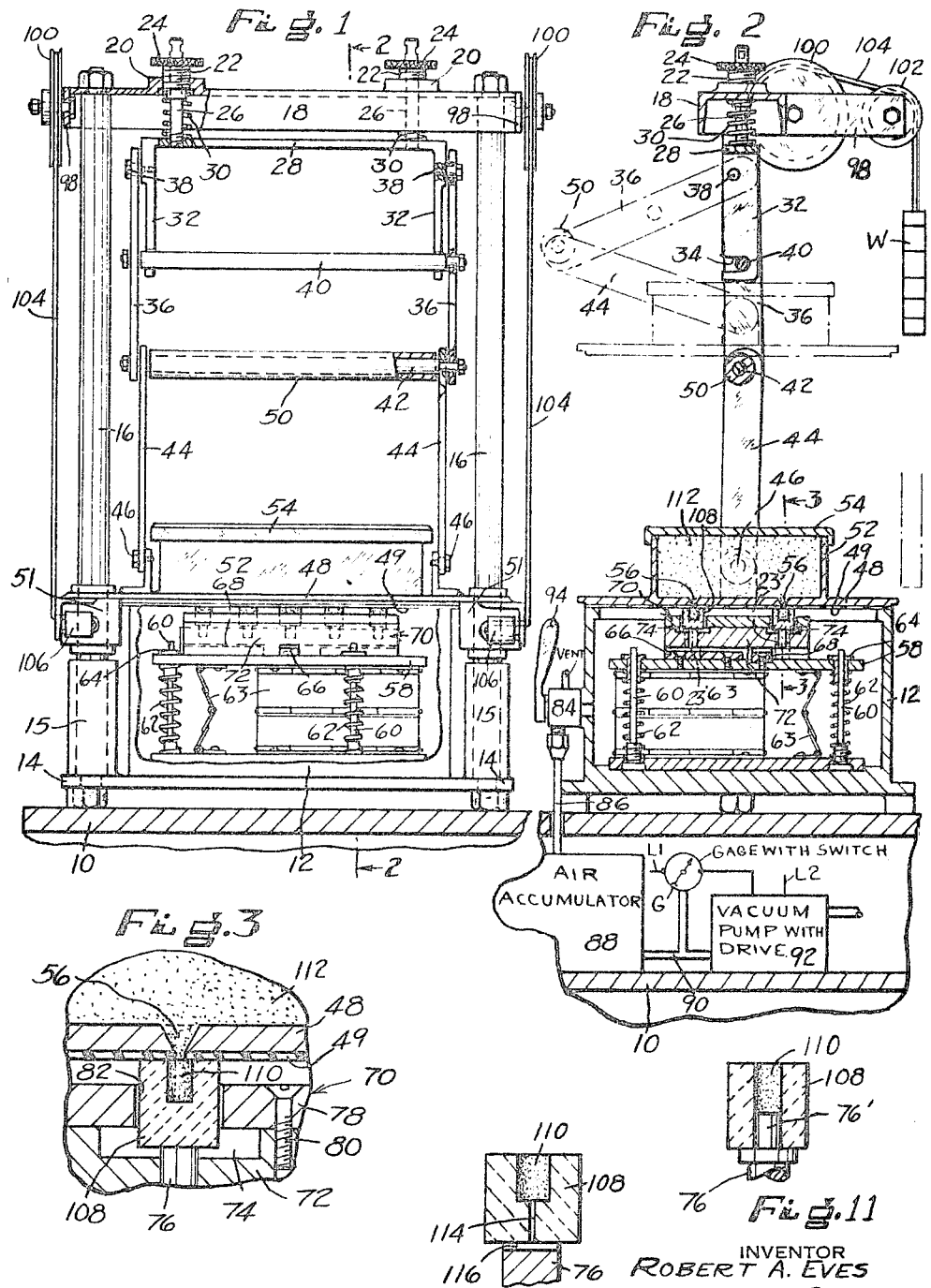

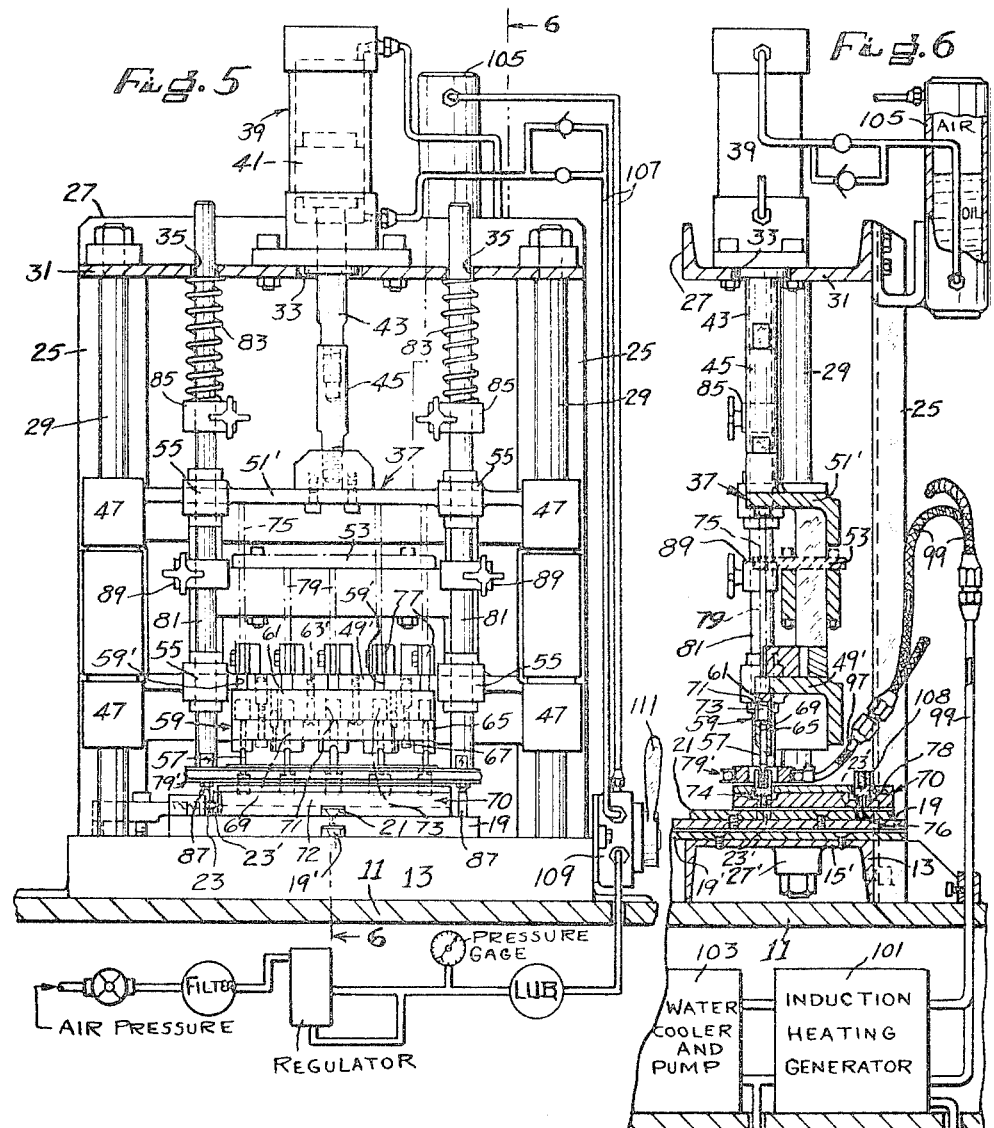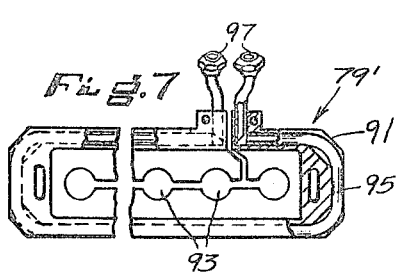

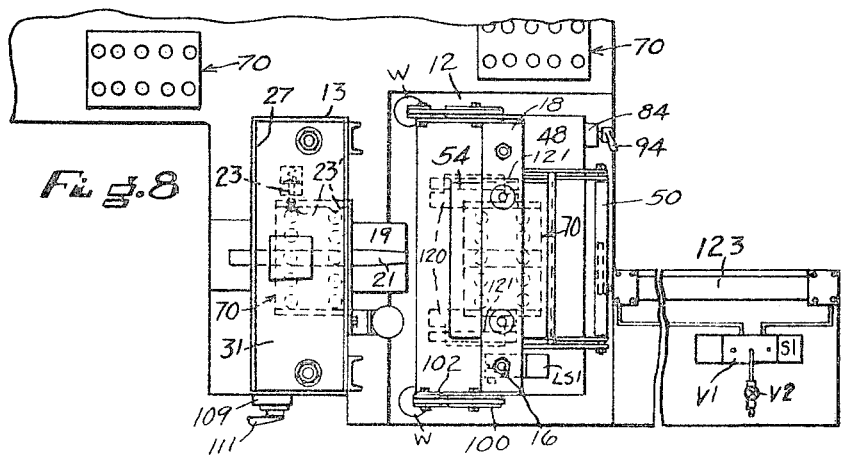
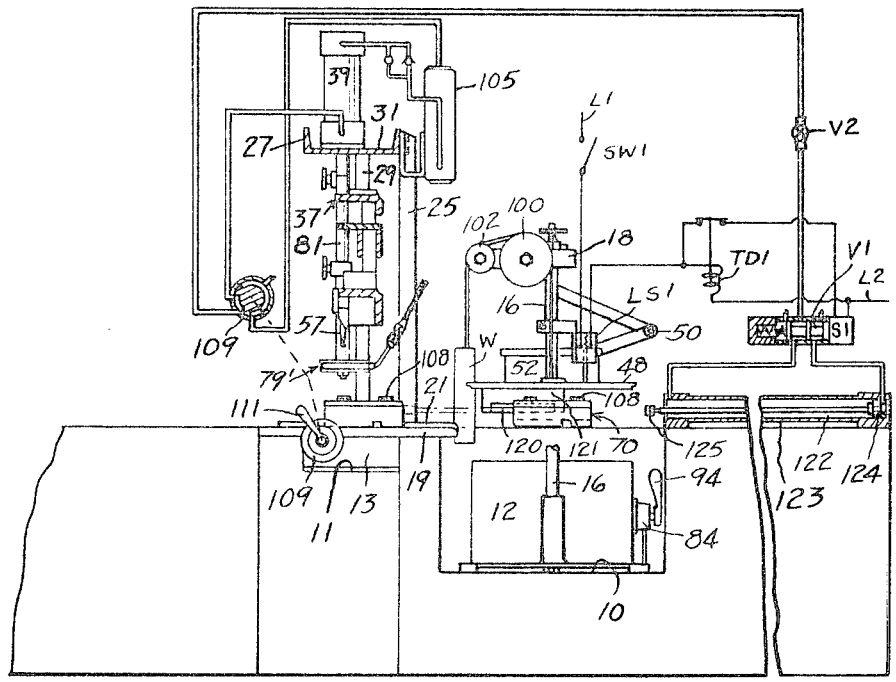
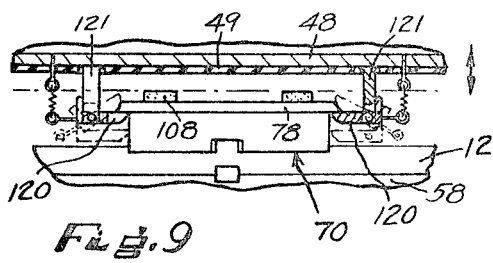

1

3,268,632
METHOD FOR USE IN THE MANUFACTURE OF GRINDING WHEEL ASSEMBLIES
Robert A. Eves, Holden, Mass., assignor to Norton Company, Worcester, Mass., a corporation of Massachusetts
Original application Nov. 10, 1961, Ser. No. 151,521, now Patent No. 3,184,797, dated May 25, 1965. Divided and this application Aug. 20, 1964, Ser. No. 397,059
2 Claims. (Cl. 264—25)

This application is a division from my prior application Serial No. 151,521, filed November 10, 1961 entitled, "Apparatus for Use in the Manufacture of Grinding Wheel and Spindle Assemblies," now Patent No. 3,184,797 issued May 25, 1965.

This invention relates to the manufacture of small grinding wheels or points and especially to a machine and process for mounting the wheels or points on their driving mandrel or spindles.

It is customary to provide each relatively small wheel or point with a center hole part way through it, although in some instances the hole may be cut completely through it, to fill this hole with a suitable cement or binder material, insert the knurled end of a driving spindle into the cement and then cause the cement to set. The performance of the foregoing operations has in the past required an excessive amount of time and has resulted in some instances of poorly mounted wheels due to the difficulties encountered in trying to fill a small hole having a blind end with the cement and because of the care which must be exercised to assemble the spindle and point and to hold them aligned while completing the cementing.

The principal objects of this invention are to provide mounted wheels and points of uniformly good quality by providing semi-automatic method for filling the spindle holes in the grinding wheels or points with a cement that may be made flowable, the filling being accomplished preparatory to inserting the steel mandrel or other form of spindle into the hole; to provide a method for assembling the spindles and points so that they are axially aligned; to provide a method for forcing the ends of the spindles through a loose powder or other form of cement during assembly so that the inner ends of the spindles are nearly seated against the bottoms of the holes; and to provide a method for holding the assemblies in alignment until the cement can be activated and set.

As herein illustrated, the foregoing is accomplished by means to perform the steps of filling and assembly which steps collectively provide for filling a plurality of points with a loose powder form of cement, inserting the lower ends of a corresponding number of spindles into the holes in the points and, while holding the spindles in place, activating the cement to fix the points thereto.

In accordance with the invention, the means to perform the filling step includes a filling apparatus which comprises a vacuum chamber, a support situated in the vacuum chamber for receiving one or preferably more points and holding the latter with the end containing the open end of the hole uppermost, a closure adapted to be held against the top of the chamber having sealing engagement therewith and with the exposed upper ends of the points surrounding the holes, the closure containing orifices in registration with the holes in the points, a container or reservoir for supplying cement to the orifices in the closure, and means for producing a vacuum in the chamber to draw the cementing material from the reservoir through the orifices in the closure into the holes in the points. The support in the chamber for the points is yieldable and adjustable and is adapted to receive the work holder positioned adjacent the top of the chamber with the points mounted therein whereby to situate the holes in the points in a position to be in registration with the orifices in the closure. The closure has at its underside a sealing gasket containing holes corresponding to the orifices. A toggle mechanism supports the closure for vertical movement into and out of operative position, there is a counterweight for balancing the closure and reservoir, and there is means for locking the toggle mechanism in its straightened position. A vacuum pump and connections therefrom to the chamber, together with a valve, provides a means for evacuating the chamber.

To complete the method of this invention the apparatus in which the method is performed is designed for removal of a support holding a plurality of powder filled points with their open ends uppermost for transfer to a spindle mounting means which includes a spindle holder arranged above the support for the points, the spindle holder carrying a corresponding number of spindles with their axes aligned with the openings exposed in the ends of the points, and means for moving the spindle holder relative to the support to force the lower ends of the spindles into the holes in the points, to penetrate the loose cement therein, and means for activating the binder following penetration of the lower ends of the spindles into the binder. The means for moving the spindle holder relative to the support is designed to yieldably apply pressure to the upper ends of the spindles throughout the time during which the cement is being activated so as to displace most of the cement from between the lower ends of the spindles and the bottoms of the holes to force it to flow into contact with the walls of the holes and the peripheral surfaces of the spindles. The spindle holder is in the form of a cross-head movable vertically toward the support and is provided with a plurality of holding means in the form of permanent magnets for supporting the spindles in spaced parallel relation with their axes perpendicular to the work support. The cross-head is provided with a presser bar for engagement with the upper ends of spindles and there is a heating means mounted on the cross-head and movable therewith into a position circumscribing the points held in their support and the lower ends of the spindles as they are forced into the holes in the points, the heat serving to activate the cement. The heating means, preferably in the form of a plurality of induction coil heating means, is yieldably mounted on the cross-head.

The invention will now be described in greater detail with reference to the accompanying drawings wherein:

FIG. 1 is a front elevation of the apparatus, with the vacuum chamber wall and other elements broken away in part, showing the closure in its operative position;

FIG. 2 is a vertical elevation, taken on line 2—2 of FIG. 1, showing the closure in operative position in full lines and in its inoperative position in dotted lines;

FIG. 3 is a fragmentary vertical section to much larger scale, taken on the line 3—3 of FIG. 2;

FIG. 4 is a fragmentary section through a point, showing its lower end resting on a supporting pin and showing an axial vent from the bottom of the hole through its lower end;

FIG. 5 is a front elevation of the assembly apparatus partly in section;

FIG. 6 is a vertical section taken on line 6—6 of FIG. 5;

FIG. 7 is a plan view of the induction heating coil showing the support therefor;

FIG. 8 is a plan view of an automated form of the machine;

FIG. 9 is a detail of a lifting device carrier of filled points;

FIG. 10 is a side elevation of the machine of FIG. 8; and

FIG. 11 is a section through an alternate point structure having a hole all the way through, showing the support structure therefor.

Referring to the drawings (FIGS. 1 and 2), the filling apparatus has a hollow base 10 which supports a receptacle 12 which has an open top side adapted to be sealed as described below, after which it is adapted to be vacuumized. The bottom of the vacuum receptacle, at its ends, has horizontally projecting flanges 14—14 to which are secured the lower ends of vertically disposed sleeves 15—15 for receiving the lower ends of vertically disposed posts 16—16. A channel member 18 is secured to the upper ends of the posts 16—16 so as to be parallel to the top of the receptacle. The channel member 18 has longitudinally spaced bosses 20—20 containing threaded openings for receiving adjusting sleeves 22—22, each of which has a knurled flange 24 by means of which it may be adjusted vertically within its boss. The sleeves 22—22 support spindles 26—26, the lower ends of which are screwed into the upper member 28 of a toggle linkage. Springs 30—30 are mounted on the spindles 26—26 between the lower ends of the sleeves 22—22 and the upper side of the member 28 to support the toggle linkage yieldably. The member 28 has laterally spaced, downwardly projecting arms 32—32, the lower ends of which contain open-end slots 34—34. A pair of rigid arms 36—36 are pivotally supported on the member 28, near the upper ends of its arms 32—32 on pivot pins 38—38 screwed into the arms 32—32. Midway between the ends of the arms 36—36 there is mounted a rod 40 which is adapted, in one position of the linkage, to have engagement with the slots 34—34. The lower ends of the arms 36—36 pivotally support the opposite ends of a rod 42 and the upper ends of arms 44—44. The lower ends of the arms 44—44 are pivotally connected by pins 46—46 to a closure 48 which is adapted to have contact with the open top of the vacuum chamber, in one position of the linkage, and to be raised therefrom, in another position of the linkage. A handle 50 is mounted on the rod 42 and provides means for manipulating the linkage to raise and lower the closure. A rubber gasket 49 (FIG. 3) is fastened to the underside of the closure so that, when the latter is held engaged with the top of the vacuum receptacle, by extension of the toggle linkage, a vacuum may be established in the vacuum chamber as will appear hereinafter. The closure 48 has at its opposite ends guide sleeves 51—51 for sliding engagement with the posts 16—16 to guide the closure into and out of engagement with the top of the vacuum receptacle and carries on its upper side a reservoir or container 52 which, in turn, has a cover 54. The bottom of the container 52 which, of course, is constituted by part of the closure 48, contains a plurality of spaced orifices 56 arranged in spaced parallel rows.

Within the vacuum receptacle 12 there is a horizontally disposed plate 58 mounted on a plurality of vertically disposed rods 60, the lower ends of which are secured to the bottom of the receptacle. Springs 62 of a predetermined length surround the rods to yieldably support the plate 58 in its uppermost position and the latter is connected by a pair of hinge members 63 disposed at 90° with respect to one another and fixed at their ends to the bottom of the receptacle and to the underside of the plate 58 respectively. Bearing means 64 carried by plate 58 serve to center the springs and slide on the upper ends of the rods for guiding the plate 58 on the rods 60.

The plate 58 is adapted yieldably to support a work holder 70 adjacent the top of the receptacle. The work holder 70 has a base 72 containing two spaced parallel channels 74—74 lengthwise thereof, the ends of which are open. A cap plate 78 is fastened by means of screws 80 to the top side of the base 72 over the channels and as best seen in FIG. 3, this plate 78 contains a plurality of openings 82 corresponding in number and spacing to the orifices 56 in the closure 48, and of a size to receive the points to be filled. As shown herein there are two rows of five holes each for supporting the points to be filled and affixed to spindles. The lower ends of the openings 82 are in communication with the channels 74—74. At the bottom of each channel 74 there are a plurality of upstanding pins 76 for holding each point spaced from the bottom of the channel with its upper end projecting upwardly through the cap plate 78. A pair of positioning keys 66 and 68 are fastened to the upper side of the plate 58 at right angles to each other for engagement with right-angularly disposed grooves or keyways in the bottom of the work holder for adjusting the work holder 70 so that the openings 82 are correctly positioned vertically below the orifices 56 in the closure.

In order to obtain a vacuum within the vacuum receptacle a valve 84 is mounted in one wall of the receptacle and is connected by a pipe 86 to an accumulator 88, the latter being, in turn, connected by a pipe 90 to a vacuum pump 92. The accumulator and vacuum pump, as shown in FIG. 2, may be located in the hollow base 10. A handle 94 on the valve 84 provides for operating the valve in such fashion as to evacuate the vacuum chamber or to vent it, as is desired. A combination gauge and switch G provides for starting and stopping the vacuum pump to maintain the pressure between the desired lowered range or predetermined level. With a reasonable size of accumulator, as many as 10 fillings can be made before the vacuum pump has to be started again.

The vacuum is effected within chamber 12 while the closure 48 is held against the top of the vacuum receptacle as shown in full lines in FIGS. 1 and 2 by connecting chamber 12 with accumulator 88. For the purpose of placing the work holder in the vacuum receptacle and removing it, the closure 48 is elevated by means of the toggle and counterweight mechanism to the dotted line position shown in FIG. 2. The closure is lifted by grasping the handle 50 and pulling forwardly on it. To assist in raising the closure the suggested counterbalancing means may be provided. To this end spaced arms 98—98 are fastened to the opposite ends of the channel member 18 and pulleys 100—100 and 102—102 are mounted thereon. A pair of cords 104—104 are entrained on the pulleys 100—100 and 102—102 with one end of each cord fastened by means of a suitable clamp 106 to one of the sleeve bearings 51 in the closure. The other end of each cord supports one or more weights W. By adding to or taking away weights the closure 48 and the container 52 with its content may be counterbalanced so that very little effort is required to raise and lower the closure.

The apparatus thus far described is designed for the purpose of filling the hole of a point with cement so that it may be applied to an end of a suitable spindle. As shown in FIGS. 1 and 3 the grinding wheels or points 108 each contain an axial hole 110 for reception of the cement and the end of the spindle to which it is to be attached. Filling the hole 110 with a powdered cement material is accomplished herein by placing a quantity of such powdered cement 112 in the reservoir 52 carried on the upper side of the closure 48, placing the work holder 70 on the plate 58 within the vacuum receptacle to fit over keys 66 and 68 to be positioned so that the upper ends of each one of the points 108 will be located directly below the corresponding orifices 56 in the closure when the latter is lowered, lowering the closure by extension of the toggle mechanism to bring the closure into sealing engagement with the vacuum chamber with the accumulator 88 so as to lower the pressure within the receptacle. Lowering the pressure operates, if the points are of porous construction, to suck the powdered cement from the container 52 through the orifices 56 into the holes 110 at the upper ends of the points and hence to fill them with the powdered cement. If the points are non-porous in construction it will be necessary to provide small vent passages 114 from the lower ends of the holes 110 through the lower ends of the points in order to draw the binder powder into the holes 110. To permit the effect of the lowering of the pressure in the receptacle to cause the powder filling to flow into the hole in this instance, the top of each pin 76 should contain a diametrical slot 116. As shown in FIG. 11, when the wheel 108 has a hole all the way through it, the wheel may be held upright by being fitted onto a non-magnetic extension 76' of pin 76. The extension can be made to the same diameter as hole 110 and the hole then filled with cement as described above.

The cementing material currently being used for this purpose is a powdered phenolic resin having a pulverized flint filler and a relatively large proportion of accelerator. The powdered binder material is designed to be cured without the evolution of gases which would otherwise tend to produce weakening pores in the cementing material.

Following deposition of the binder material in the holes in the points handle 94 is shifted to close the passage to the accumulator 88 and vent the receptacle 12 to the atmosphere so that the closure 48 may be raised. The work holder 70, with the plurality of filled points still situated therein, is then transferred to the assembly apparatus, shown in FIGS. 5, 6 and 7, wherein spindles are inserted into the cement filled holes in the points and the cement is activated to effect at least a partial cure whereby to affix the spindles solidly in position. Thereafter the assemblies are transferred to still another apparatus for truing and dressing the points so that their surfaces are concentric with the axes of the spindles. With certain cements, such as the phenolic described above, a complete curing of the cement may be required to develop the ultimate strength for binding the spindle and point together.

The spindle assembling and attaching apparatus, as shown in FIGS. 5 and 6 comprises a hollow base 11 which supports a downwardly facing channel member 13, the web 15' of which provides a support for a linearly slidable base plate 19 upon which the work holder 70 may be placed. The plate 19 has a key way for cooperating with fixed key 19', the plate 19 being guided by the key to slide in a direction at right angles to a plane including the axes of guide posts 29 to be described later. As previously pointed out, the work holder 70 has, on its underside, right-angularly disposed keyways and there are adjustably mounted keys 21 and 23' fastened to the base plate 19 slidably mounted on the web and keys 21 and 23' are adapted to fit into the keyways on the bottom of the work holder 70 to accurately align it with the means for supporting the spindles for assembly with the points. A suitable detent 23 is adapted to cooperate with V notches 23' to locate first one line of points 108 under a series of spindles in their holders and then plate 19 may be moved on the key 19' until detent 23 snaps into a second V notch 23' to locate the second row of points 108 under another series of spindles as will appear more fully below.

A pair of vertically disposed and rearwardly facing channel members 25—25 are bolted to the rear side of the channel member 13, near its opposite ends, so as to extend upwardly therefrom, and a horizontally disposed upwardly facing channel member 27 is bolted to the upper ends of the channels 25—25 to provide a rigid upstanding supporting frame. Bosses 27'—27' are integral with the web 15' of the channel member 13, near its opposite ends, and contain vertically disposed holes within which the lower ends of spaced parallel posts 29—29 are similarly secured thereto. The web 31 contains a center opening 33 and symmetrically disposed, lateral openings 35—35. The posts 29—29 support a cross-head 37 between the channel members 13 and 27 for vertical movement to and from the supporting web 15'. Vertical movement is effected by a cylinder 39 bolted to the web 31 of the channel member 27. A piston 41 in the cylinder is connected by a piston rod 43 to the cross-head. Preferably the piston rod is threaded into a coupling 45 bolted to the cross-head to permit adjustment.

The cross-head 37 comprises a rigid frame having, at its opposite ends, pairs of vertically spaced bearing sleeves 47—47 slidable on the posts 29—29. The frame has three vertically spaced, horizontally disposed, forwardly extending supports 49', 51' and a removable one 53 shown in dotted lines in FIG. 6. The supports 49' and 51' each carry a pair of bearing sleeves 55—55. The support 53 is removable, and removed when longer spindles are mounted in the points by the support 51'.

The cross-head 37 is designed to support a plurality of spindles in vertically disposed positions for movement of their lower ends downwardly into the open ends of the points supported on the work holder 70. For supporting relatively short steel spindles 57 a spacer 59 is attached to the underside of the lower transverse support 49'. The spacer comprises a bar 61 fastened to the support 49' by bolts 63' and a bar 65 fastened to the bar 61 by bolts 67. The bar 65 contains spaced, vertically disposed openings 69 corresponding substantially in diameter to the upper ends of the spindles so that the spindles may be manually thrust into the openings. The openings 69 correspond in spacing to the spacing of the points in the work holder 70. The bar 61 contains openings 71 corresponding in number and spacing to the openings 69, each of which holds a permanent magnet 73. The magnets hold the steel spindles suspended when the cross-head is in an elevated position preparatory to lowering it for the purpose of forcing the lower ends of the spindles into the points.

If longer spindles 75 are to be employed, several of which are indicated by the dotted lines in FIG. 5, support 53 is removed and the spacer 59, comprising the bars 61 and 65, is also removed by removing the bolts 63'. The lower support 49' has in its forward edge a plurality of spaced U-shaped openings 59' through which the longer spindles pass. Permanent magnets 77 are mounted on the upper side of the lower support 49' which also contain U-shaped openings through which the spindles pass and are held suspended. Each magnet 77 holds its respective spindle in a V shaped support which axially aligns the spindle relative to its point. The upper ends of the spindles 75 bear against the lower side of the upper support 51'.

If spindles 79 of intermediate length are to be employed, several of which are also shown in dotted lines in FIG. 5, the support 53 is mounted on the cross-head between the supports 49' and 51', as shown in dotted lines, for engagement with the upper ends of the spindles of intermediate length. The permanent magnets 77, referred to above, which support the long spindles also serve to hold the spindles of intermediate length in place.

Spindles whether of short, intermediate, or long dimension are mounted in their holders whereup the cross head 37 may be lowered. After the spindles are lowered and forced into cement filled holes in the points, partial activation and curing of the binder to fix the points to the spindles is effected by induction heating. To this end, an induction heating unit 79' (FIG. 7) is mounted on the cross-head for movement with the spindles toward the work support. The heating unit 79' is attached to the lower ends of a pair of spaced parallel rods 81—81, the latter being slidably supported in the pairs of bearing sleeves 55—55 on the cross-head with their upper ends projecting through the openings 35—35 in the channel member 27. Springs 83—83, disposed about the rods 81—81 with their ends engaged respectively, with the underside of the channel member and adjustable collars 85—85, provide for yieldably raising the induction unit with the crosshead when the latter is elevated and provides for yielding positioning of the unit around the points to heat the spindles as the crosshead is lowered into its operative position. By adjusting the collars 85—85 the spring pressure may be increased or decreased. Pins 87—87 are mounted on the web below the cross-head for limiting the downward movement of the heating unit.

Adjustable collars 89—89 on the rods 81—81, engageable by the lower ones of the sleeves 55—55 as the cross-head is elevated, raise the heating unit from the support.

The vertical distance that the cross-head 37 travels can be varied by varying the stroke of the piston 41 and also by adjusting the screw-threaded coupling between the piston rod and the cross-head.

The induction unit, as shown in FIG. 7, is an elongate plate 91 containing openings 93 corresponding in spacing to the spindles. An induction heating element 95 is mounted on the plate. The element 95 is hollow and is connected by common leads 97 and conductors 99 to a high frequency generator 101 and to a water cooler and pump 103 (FIG. 6).

The cross-head is moved up and down by the hydraulic cylinder 39, the latter being supplied with pressure fluid from an oil-air pressure cylinder 105 which is connected to a source of air pressure by pipes 107 under the control of a valve 109 operated by a handle 111.

With this apparatus, after the spindles have been forced into the binder powder located in the openings in the points, the binder, which is of the kind that becomes partially plasticized during heating, will be displaced by the lower ends of the spindles due to the constant pressure maintained on the cross-head during curing so that the knurled ends of the spindles will be forced toward and almost seat against the bottoms of the holes in the points and most of the binder which, when in powder form, was trapped between the lower ends of the spindles and the bottoms of the holes will be displaced so as to flow upwardly along the sides of the spindles. This construction insures the setting and mounting of each spindle at the same depth in its point with a small amount of binder between the end of the spindles and the bottom of the hole, and hence uniformity in the axial length of the finished assembly.

Following the initial positioning and securing of the points to the spindles they may be removed from the carrier or support 70 and the surfaces of the points are dressed so as to be concentric with the axes of the spindles. If necessary, the assemblies may then be subjected to a final curing operation to complete the polymerization of the cement or binder holding the spindle fixed to the point.

The aforesaid apparatus has been used successfully for mounting vitrified wheels or points on the knurled ends of driving spindles, however, it can be used equally well for mounting a wheel or point of any desired composition, whether abrasive or not, on a driving spindle provided precautions are taken to employ a binder which can be activated without adversely affecting the wheel itself and provided the wheel is porous in character or may have a vent in it extending from the bottom of the spindle hole to the opposite end.

In FIGS. 8, 9 and 10 there is shown a partially automated form of the machine which included a transfer mechanism for automatically moving the points after they are filled with the cement from the vacuum chamber into position under the spindle inserting mechanism. This construction as shown in FIG. 10 makes use of a pair of spring actuated latches 120 supported on the underside of cover 48, to engage under an extension of the cap plate 78 of the carrier 70. The latches snap over the cap plate when the cover is lowered and when the cover is raised the container is lifted with it. The latches take the form of elongated hinged track members that are pivotally supported one on each side of carrier 70 at the lower ends of the downwardly extending notched brackets 121. Sufficient clearance is provided between the lifting surfaces of the latches and their engagement with the bottom sides of the extending edges of the cap plate to permit the latches to swing into the lifting position and cover 48 to be raised a short distance to break its sealed relation with points 108 and chamber 12 before the latches pick up carrier 70. Upon continued raising of the cover, however, the play is taken up and carrier 70 is lifted upwardly to clear the upper edges of the walls of chamber 12.

When the cover 48 reaches the upper end of its lifting stroke, it is held there by the weights W. The carrier 70 is held on the elongated latch elements 120 so that its bottom surface is in planar alignment with the surface of plate 19 of the spindle setting machine. The carrier 70 may then be pushed laterally while still supported on the hinged latch elements which serve simultaneously as a guiding track until the bottom of carrier 70 passes onto plate 19 and a keyway or guideway in the bottom of the carrier engages the key or guide 21. Thereafter the carrier 70 is supported on and slid across plate 19 until detent 23 engages V groove 23' which is equal to the length of the stroke of the piston in the cylinder, whereby the first row of points in the carrier is lined up under a row of spindles carried by cross-head 37.

To accomplish the automatic delivery of the carrier from the cement filling station to the spindle setting station, a combined electrical and hydraulic or pneumatic circuit may be used. Referring to FIG. 10, an electrical circuit energized by closing switch SW1 may be provided which circuit includes a normally open switch LS1 that is adapted to be closed when the cover is fully raised. The closing of switch LS1 establishes a circuit through the time delay relay TD1 and solenoid S1. When S1 is actuated a valve V1, which as here shown is an air valve, is shifted to feed air under pressure into the right hand side of air cylinder 123. The piston 124 carried in this cylinder is driven to the left to force pusher 125 to engage against and push the fully raised carrier to the left and onto plate 19. An adjustable valve V2 controls the rate of movement of the piston 124. S1 remains energized as long as time delay relay TD1 remains closed but as soon as TD1 contacts open, the solenoid S1 is deenergized and V1 is driven to the right by a spring means. The air cylinder is then vented on the right hand end and air is delivered on the left side of the piston to retract the pusher 125 to the position shown in FIG. 10. If for any reason the cover 48 were lowered while the pusher was being driven toward the left, the circuit through switch LS1 would be broken and the pusher would be immediately retracted when S1 became deenergized.

In using this form of the machine an operator manually loads filled carriers into the vacuum chamber and operates the toggle for raising and lowering the cover 48. The transfer mechanism above described operates automatically to move the filled carriers from the vacuum chamber into aligned position to receive the spindles in the first row of points in the carrier. The operator stationed at the spindle mounting machine manually moves the carrier into position to receive a second row of spindles in the remaining points in the carrier. It is obvious that these few manual operations could be automated if it were desired to render the machine completely automatic.

It should be understood that the present disclosure is for the purpose of illustration only and that this invention includes all modifications and equivalents which fall within the scope of the appended claims.

I claim:
1. A method of making a grinding point assembly of the kind comprising an abrasive point having a blind hole and a metal spindle fixed to the point within the hole by means of a binder, which comprises:
   supporting the point with the axis of the hole in a vertical position within an open top chamber;
   said point being positioned in the chamber so that most of its surface is exposed to the chamber;
   sealing off the top surface of the point surrounding the hole therein and the open top of the chamber from the outside atmosphere;
   positioning a reservoir containing binder material and an orifice in registration with the hole;

drawing a vacuum in the chamber and the hole to suck binder into the hole until the hole is sufficiently filled with the binder material forced into the hole by the atmospheric pressure above the reservoir;

venting the vacuum to allow removal of the filled point from the chamber;

transferring the point having its hole filled with binder from the chamber to a spindle mounting station having a holder with a spindle supported therein in axial alignment with the axis of the hole;

inserting one end of said aligned spindle in said holder into the binder;

yieldably forcing said end of the spindle into the binder in the hole; and heating the spindle sufficiently to first render the binder the binder plastic as the end of the spindle is heated while it is yieldably forced into the binder and then continuing the heating to harden the binder while the end of the spindle is held aligned and seated in the hole.

2. A method of making a grinding point assembly according to claim 1 wherein the heating step includes:

induction heating at least the portion of the spindle in the binder.

References Cited by the Examiner
UNITED STATES PATENTS

| | | | |
|---|---|---|---|
| 1,446,067 | 2/1923 | Reagan | 264—262 |
| 1,557,707 | 10/1925 | Kyle | 264—261 |
| 1,863,854 | 6/1932 | Jeffery. | |
| 3,162,705 | 12/1964 | Smucker et al. | 264—91 |

ROBERT F. WHITE, *Primary Examiner.*

F. MARLOWE, L. S. SQUIRES, *Assistant Examiners.*